B. SCHWERIN.
ELECTRO OSMOTICAL FILTER PRESS.
APPLICATION FILED APR. 8, 1913.
1,156,715. Patented Oct. 12, 1915.
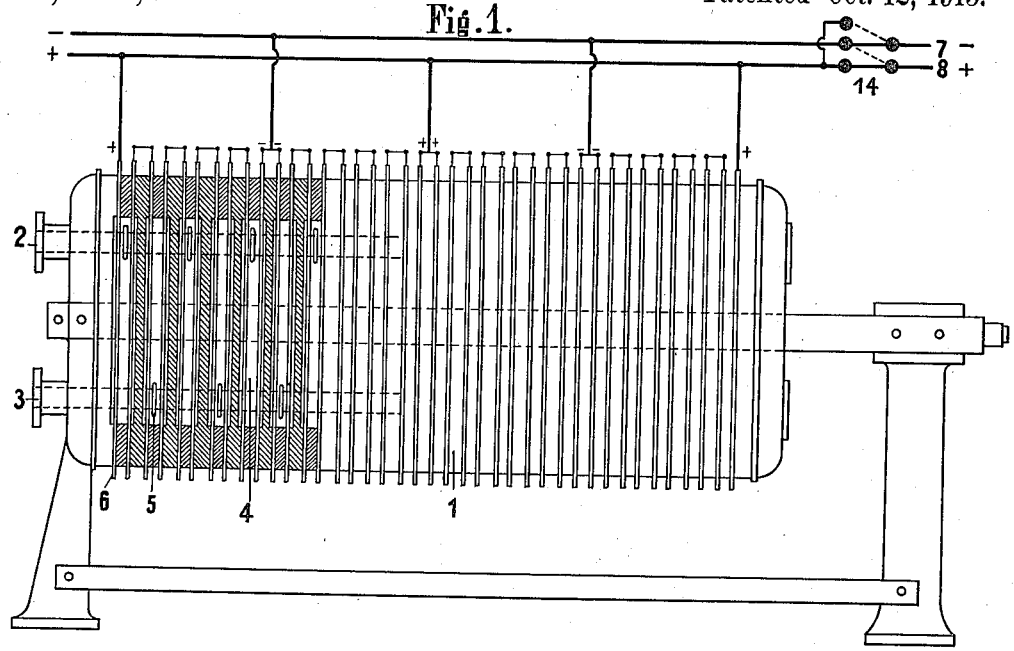
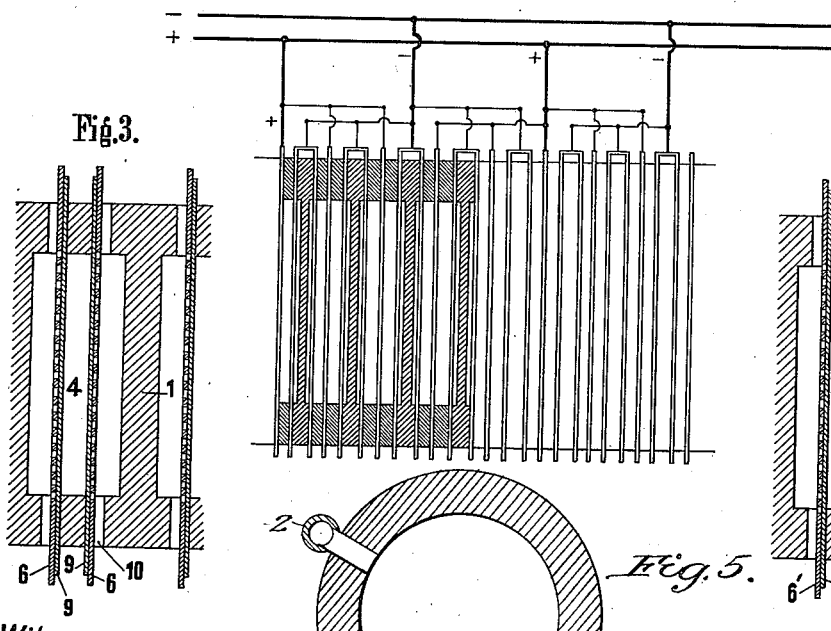
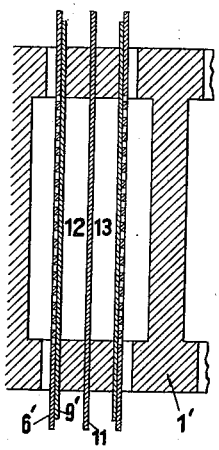
Witnesses:
B. A. Hanway
S. K. Miskell
Inventor:
Botho Schwerin
By
Mason Fenwick & Lawren
Attys.

UNITED STATES PATENT OFFICE.

BOTHO SCHWERIN, OF FRANKFORT-ON-THE-MAIN, GERMANY, ASSIGNOR TO GESELLSCHAFT FÜR ELEKTRO-OSMOSE M. B. H., OF FRANKFORT-ON-THE-MAIN, GERMANY, A CORPORATION.

ELECTRO-OSMOTICAL FILTER-PRESS.

1,156,715. Specification of Letters Patent. Patented Oct. 12, 1915.

Application filed April 8, 1913. Serial No. 759,798.

*To all whom it may concern:*

Be it known that I, BOTHO SCHWERIN, residing at Frankfort-on-the-Main, Germany, have invented certain new and useful Improvements in an Electro-Osmotical Filter-Press, of which the following is a specification.

There are a large number of substances such as peat, clay, kaolin and the like from which water or other liquid cannot be entirely removed by mechanical means, or only with extreme difficulty. Filter presses of previously known construction have worked fairly satisfactorily as long as the solid particles in suspension are comparatively large grained. But they operate less and less satisfactorily and with increasing expense the finer the particles become and when the colloidal size of particles is reached these filters are quite impossible, since as the degree of fineness of the particles increases, the pressure used must be correspondingly increased, and as the pressure increases, more filter cloths are used and more energy is expended.

The present invention relates to a filter press by using of which the liquid is extracted by electrical-osmosis in conjunction with more or less mechanical pressure or suction.

The invention is shown in the accompanying drawings.

Figure 1 is a view, partly in vertical section, partly in elevation, of one embodiment of the invention. Fig. 2 is a fragmentary view showing a modified form of the invention, partly in vertical section, partly in elevation. Fig. 3 is a vertical sectional view on an enlarged scale of the form of the invention shown in Fig. 1, and Fig. 4 is a view similar to Fig. 3 of the modification. Fig. 5 is a detail view showing the connections of the feed pipes.

The press (Figs. 1 and 3) consists of a number of chambers (4) which are separated from each other by partitions (1). Each chamber contains electrodes (6), which are insulated from the filter press and perforated and which may be, when desired, covered with filter cloths (9). The suspension is conveyed to the chambers by the tubes (2) and (3), which connect with the interior by slits (5) in such a manner, that the suspension is surrounded by the electrodes. There are corresponding openings (10) provided in the outer part of the chambers which allow the discharge from the press of the liquid which has been pressed through the filter cloths and electrodes, while the solid material is detained between the electrodes in the middle part of the chambers.

The joining of the electrodes (6) to the leads (7) and (8) may be as desired always provided that two of the electrodes existing in a chamber have unequal polarity. In Fig. 1 the electrodes are connected in parallel groups in series.

The working of the filter press is as follows: The liquid is conveyed to the press by pressure or suction through the tubes (2) and (3) and the current is switched on. Under the influence of the pressure and the electro-osmotic effect of the current the mass between the electrodes gets desiccated and the water flows off through the openings (10). During this process the substance is pumped in under slight pressure, according to the amount of water removed, until the compact matter left has attained the desired degree of dryness. Then after the current has been switched off and the hydraulic pressure released, the press is emptied in the usual manner.

In Figs. 2 and 4 another form of the present invention is shown. Here each chamber contains a non-perforated electrode (11) and on both sides of same two perforated electrode (6') which, as in Fig. 3 may again be covered with filter cloths 9'. In this way two chambers (12) and (13) are formed, in which the drying process takes place in the same manner as in the chambers (4) of Fig. 3. Filter cloths 9' and electrodes 6' are similar to the corresponding elements in Fig. 1. The partitions between the chambers are designated 1'. The particles deposit on the filter-cloths as the liquid passes out through the perforated electrodes. The particles also settle in the bottom of the chambers between the cloths.

When all the electrodes of the same sign are connected in parallel so that there is no difference in potential between the same, the electrodes do not have to be insulated from the body of the filter press, it is then sufficient to insulate the electrodes of the other sign from the press.

The electrodes are made preferably of hard lead.

With the present filter press only a very small pressure is required compared to that usually employed. Whereas in previously known methods pressures up to 20 atmospheres have been necessary, with the present press the pressures may be reduced, even to 1 atmosphere and under certain conditions suction may be used instead.

When treating peat, clay or chalk according to the present invention, ferric hydroxid and other substances separate out at the electrode toward which the water migrates generally the cathode and gradually chokes the press by preventing the escape of water. This disadvantage can be obviated by reversing the flow of current after each or several charges. The deposited substances are then freed or migrate in the opposite direction into the cakes of compressed material and are removed with these. The reversing of the current can be made in the well known manner by using a changing switch in the leads. (14 in Fig. 1.)

Having now particularly described and ascertained the nature of my said invention and in what manner the same is to be performed, what I claim, is:

1. An electro-osmotical filter press comprising perforated electrodes defining therebetween a space of constant volume, means to supply electric current to the electrodes, means to supply a suspension to the space.

2. An electro-osmotical filter press comprising perforated electrodes defining therebetween a space, means to pass current between the electrodes, means to supply suspension to the space, the electrodes being stationary to keep the space at constant volume.

3. An electro-osmotical filter press comprising perforated electrodes, defining a space of constant volume, means to pass current between the electrodes, means to supply suspension to the space, filter cloths mounted on the adjacent sides of the electrodes.

4. An electro-osmotical press comprising perforated electrodes defining therebetween a space of constant volume, means to pass current between the electrodes, means to supply suspension to the space, and means to hold the electrodes and the suspension therebetween against movement.

5. An electro-osmotical filter press comprising a pair of perforated electrodes, an electrode locked between said pair, means to charge the pair at a potential different from the electrode between the pair, there being defined between the pair of electrodes a space, means to supply a suspension to the space.

6. An electro-osmotical filter press comprising a pair of perforated electrodes, filter cloths on the adjacent sides of the electrodes, an electrode located between the cloths, means to supply a suspension to the space defined between the cloths, and means to charge the pair of electrodes at a potential different from the potential of the electrode between the cloths, the electrodes being held stationary.

7. An electro-osmotic filter press comprising spaced electrodes providing a chamber of constant capacity, and means for introducing a suspension into the chamber, said electrodes permitting the passage of liquid therethrough.

In testimony whereof I affix my signature in presence of two witnesses.

BOTHO SCHWERIN.

Witnesses:
  JEAN GRUND,
  CARL GRUND.